(12) United States Patent
Vassallo

(10) Patent No.: US 9,078,419 B1
(45) Date of Patent: Jul. 14, 2015

(54) PROTEIN SKIMMER WITH SELF-REGULATING INTERNAL WATER LEVEL CONTROL

(71) Applicant: James Allan Vassallo, Covington, WA (US)

(72) Inventor: James Allan Vassallo, Covington, WA (US)

( * ) Notice: Subject to any disclaimer, the term of this patent is extended or adjusted under 35 U.S.C. 154(b) by 206 days.

(21) Appl. No.: 13/986,064

(22) Filed: Mar. 27, 2013

Related U.S. Application Data

(60) Provisional application No. 61/685,916, filed on Mar. 27, 2012.

(51) Int. Cl.
*A01K 63/04* (2006.01)
*B01D 1/20* (2006.01)

(52) U.S. Cl.
CPC ............. *A01K 63/045* (2013.01); *A01K 63/042* (2013.01)

(58) Field of Classification Search
CPC ... A01K 63/045; A01K 63/04; A01K 63/042; C02F 1/24; B01D 21/2433; B01D 21/30; B01D 37/04; B01F 2003/04865; Y10S 210/905; B03D 1/02
USPC .............. 210/167.26, 416.2, 123, 121, 167.1, 210/167.21, 94, 167.27, 416.1, 776, 703; 119/264, 263, DIG. 75; 261/76, 64.1; 137/434; 417/40
See application file for complete search history.

(56) References Cited

U.S. PATENT DOCUMENTS

| | | | | |
|---|---|---|---|---|
| 5,292,431 A | * | 3/1994 | Romagnoli | 210/127 |
| 5,975,022 A | * | 11/1999 | Miller | 119/264 |
| 6,517,724 B1 | * | 2/2003 | Malone | 210/618 |
| 6,869,530 B1 | * | 3/2005 | Venezia | 210/221.2 |
| 2008/0006569 A1 | * | 1/2008 | Liu | 210/167.26 |

* cited by examiner

*Primary Examiner* — Nam Nguyen
*Assistant Examiner* — Claire Norris
(74) *Attorney, Agent, or Firm* — Seed IP Law Group PLLC

(57) ABSTRACT

The embodiment of a protein skimmer apparatus comprising a float (18) controlled suction inlet valve (16), comprised of tubing, such as clear vinyl tubing, preferably horizontally mounted, centrally and predominantly severed or "cut" laterally in an upwardly direction, maintaining an elastically deformable segment acting as a pivoting axis, pivoting upwardly, on one end in communication with first tubing connector (30), in communication with first tubing (19), in communication with second tubing connector (31), in communication with a second tubing (20), in communication with third tubing connector (32), in communication with suction inlet opening of water pump elbow (17). On a second end slip fittedly connected, thereto one end of valve actuator (15). Float (18) having vertical holes therein and receiving valve actuator (15) slip fittedly projected through float (18). Suction inlet valve (16) is responsive to movement by float (18). Water pump (26) directing water into lower end of air/water chamber (13), such that water rises within air/water chamber (13), as to raise float (18) buoyantly pivoting upwardly, therefore opening suction inlet valve (16), therefore enabling airflow into water pump (26), therefore reducing water pressure governed by airflow volume, therefore establishing water level (B) in response to vertical position of float (18).

16 Claims, 11 Drawing Sheets

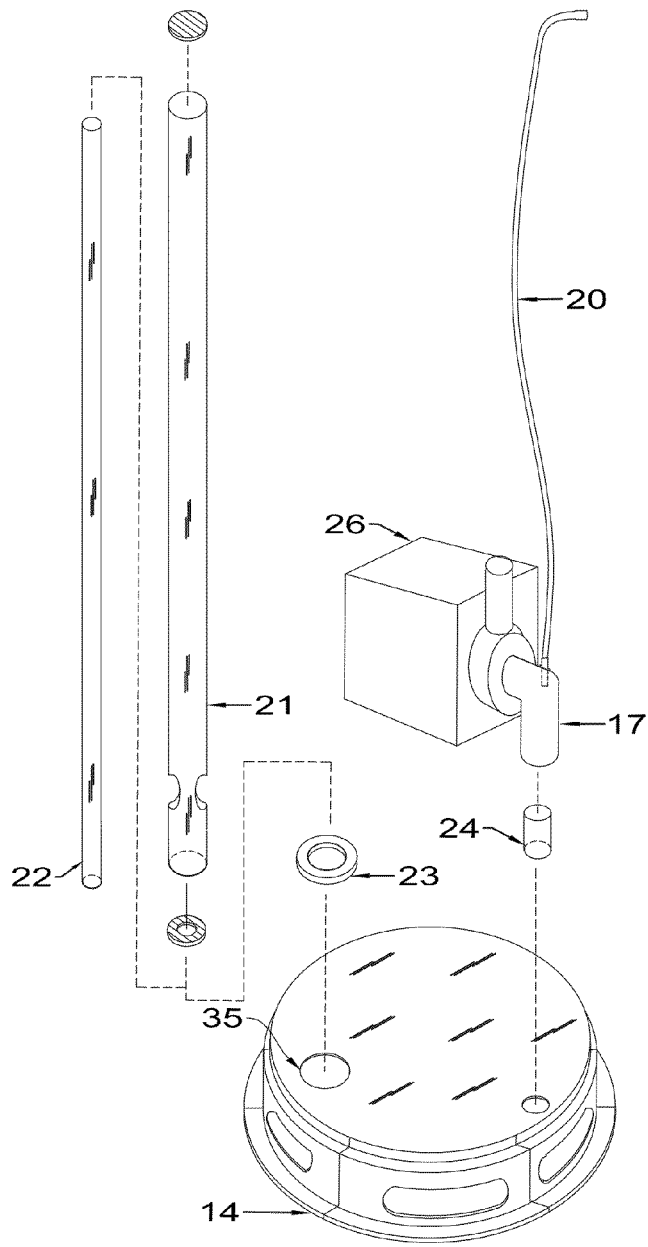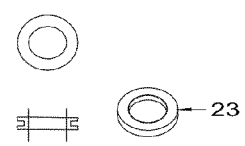
Fig. 9
Fig. 10
Fig. 11

PROTEIN SKIMMER WITH SELF-REGULATING INTERNAL WATER LEVEL CONTROL

CROSS-REFERENCE TO RELATED APPLICATIONS

Application claims benefit of the provisional application 61/685,916 filed on Mar. 27, 2012.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

The present disclosure relates to bubble generating protein skimmers, which are typically used with aquariums, and other various methods associated with the removal of protein particle waste from aquarium water. Protein skimmers have been around for many years but without any self regulating internal water level controls to adjust for the constant changing water levels in the sump tanks that they operate in. Protein skimmers are used in aquariums and are essential for the health and water clarity of every aquarium. Proteins are toxic and are constantly being generated by fish and all living things in the aquarium. Protein skimmers remove protein particles from the aquarium water by generating and introducing air bubbles in a water filled air/water chamber where the protein particles in the water naturally attach themselves to the air bubbles when they come into contact with them then float upward through the air/water chamber creating a foam column above the internal water level where the foam gradually spills over into the collection chamber.

Sump tank systems are designed so the sump tank water level varies from evaporation while the main aquarium water level remains constant. Evaporated water is replenished by one of two ways by the aquarium owner.
1. Aquarium owner pours water into sump tank as needed manually. This method creates the greatest variation is sump tank water levels as the timing and amount of water added will vary when it is replenished.
2. Aquariums with electronic float controlled water level systems and dedicated water supplies have a consistent water level variation. These water level variations will be different depending on the system.

Protein skimmers having manual adjusting knobs, dials, valves, sliding gates, or stove pipe tubes as a means of adjusting internal water level require constant daily adjustment.

Aquarists, having to figure out how to adjust the internal water level height with the use of valves, knobs, dials, sliding gates, or stove pipe tubes, may not realize the problematic in-sumptank water level changes that alter internal water levels.

Aquarists manually adjusting air and water flow valves may improperly result in reduced water & air flows greater than manufacturer's intention resulting in poor functionality. Once flooding of collection container has occurred by owner's protein skimmer, owners tend to adjust internal water level more to the safe side of adjustments further minimizing the collection of contaminants from the aquarium.

Protein skimmers with no internal water level control system to compensate for sump tank water level changes, algae growth, water pump wear and voltage fluctuations are almost always off of their peak performance internal water level. When another appliance is turned on such as the high powered aquarium lights on the same circuit as the water pump, power level may be reduced to water pump changing the water pressure it produces. Aquariums have high powered lighting that is on during the day and off at night. This will cause power fluctuations to all items on the same circuit.

Other protein skimmers internal water levels are always changing, varying the distance of the internal water level to the top of the riser column "entrance of collection container". When internal water level is low, the contaminants end up stuck to the sides of the riser column with a low accumulation of considerably dryer contaminants entering into the collection container if at all, resulting in very poor contaminant removal. When the internal water level is too high water flows freely into collection container at the top of the riser column flooding the collection container, forcing previously collected contaminants back into sump tank and into Aquarium.

An additional drawback associated with certain existing protein skimmers is a requirement to disconnect power to water pump in order to empty collection container in order to prevent water flowing down outside of protein skimmer.

An additional drawback associated with certain exiting protein skimmers is an inability to operate in low water levels as low as one inch without drawing in air from sump tank water's surface into water pump damaging or destroying it. Water pumps with a horizontally directional intake port need at least 2" of water above port to prevent air suction from water's surface depending on HP of water pump.

Aquarists without automatic sump tank water re-fill systems which require a dedicated water supply connected to a water purification filter (R/O filter) with the water flow controlled by an N/C (normally closed) electronic water valve, in which the power to it is controlled by an automatic float switch in the sump tank, cannot keep other protein skimmer designs adjusted properly. These aquarist's without dedicated water re-fill systems pour water into sump tanks by hand at a varying amount of water and frequency of time. These aquarist's have the greatest fluctuations in sump tank water levels and protein skimmer internal water levels. Automatic sump tank water re-fill systems, depending on the range of the float switch's on and off height differential and the volume of the sump tank, can cycle as often as 2 or 3 times a day.

An additional drawback associated with certain existing protein skimmers is an inability of removing larger particles and material too heavy or too large to be removed by the process of foam fractionation.

Loud noise levels of hissing or sucking sounds may be caused by air intake ports where the air is drawn into the protein skimmer that creates the air bubbles.

Water falling back into the sump tank from stove pipes that allows the water to spill out the top of the pipe back into the sump tank may generate additional unwanted sounds.

Foul odors may be caused by the release of air escaping from the collection container which flows at the same rate as being drawn into the protein skimmer that generates the air bubbles.

External water pumps with extravagant plumbing configurations create a risk of breakage during handling, have large footprint requirements, and experience considerable loss of water pressure by friction through elaborate and excessive plumbing. Also increased surface area for algae growth inside plumbing further reduces water flow over time.

Failure of the water pumps may be caused by damage from turning them off & back on again (which is required when emptying collection container) or damage from sump tank water levels ending up too low allowing air to be drawn into pump from sump tanks water surface. Water pump failure is a very common problem according to online Forums.

Micro sized air bubbles escaping back into sump tank and back into aquarium cause clarity problems in the aquarium.

FIELD OF THE INVENTION

The present disclosure relates to bubble-type protein skimmers, which are commonly used with aquariums, and various methods associated with the removal of protein from aquarium water.

BRIEF SUMMARY OF THE INVENTION

Aquarist does not have to worry about adjusting knobs, dials, valves, sliding gates, or stove pipe tubes. The Protein Skimmer is "Plug & Play" with the properly selected siphon tube assembly installed for example 1"-5" sump tank water level.

Protein Skimmer Prototype has an internal water level control system that automatically adjusts and maintains protein skimmers internal water level to manufacturers predetermined riser column height, for example 2 inches below flood point. Sump tank water level variations, limited Algae growth, limited water pump wear, and voltage fluctuations have very little, to no effect at all on internal water level in protein skimmer thanks to the internal water level control system.

Aquarist can quickly & easily modify protein skimmers predetermined internal water level to customize for the amount of protein generating hosts in the aquarium. Example: Customers with larger aquariums with greater amounts of protein generating hosts may want a lower internal water level due to the amount of foam accumulating above internal water level. This is how the customer can modify the amount of moisture captured with contaminants.

Protein skimmer emits no noticeable odors and eliminates water clarity problems caused by micro air bubbles escaping back into aquarium.

This protein skimmer design eliminates the necessity of disconnecting the power to the water pump when emptying collection container. (This eliminates water pump damage caused by turning off & restarting water pump, dramatically increasing the life of the water pump.) It also prevents contaminants in the protein skimmer's mixing chamber not yet passed into collection container, from draining back into the sump tank thus back into aquarium. This increases protein skimmer's efficiency and it also eliminates the inconvenience to customers of unplugging the power cord and the risk of electrical shock often having wet hands after cleaning collection container when plugging it back in.

It is intended that this application of invention includes all concepts of the present disclosure to be used for other type applications as well. All variations of this current design incorporating the same or similar principles, characteristics, and control systems of the present disclosure are to be included in this application of invention.

BRIEF DESCRIPTION OF THE SEVERAL VIEWS OF THE DRAWING(S)

FIG. 1 is a perspective view of a protein skimmer which embodies principles of the present disclosure;

FIG. 9 is an exploded assembly view of the lower section of protein skimmer of FIG. 2;

FIG. 10 is a front elevation view, top view, and perspective view of 23 in FIG. 9;

FIG. 11 is a an exploded view of 17 and 20 in FIG. 9;

Figure 1:
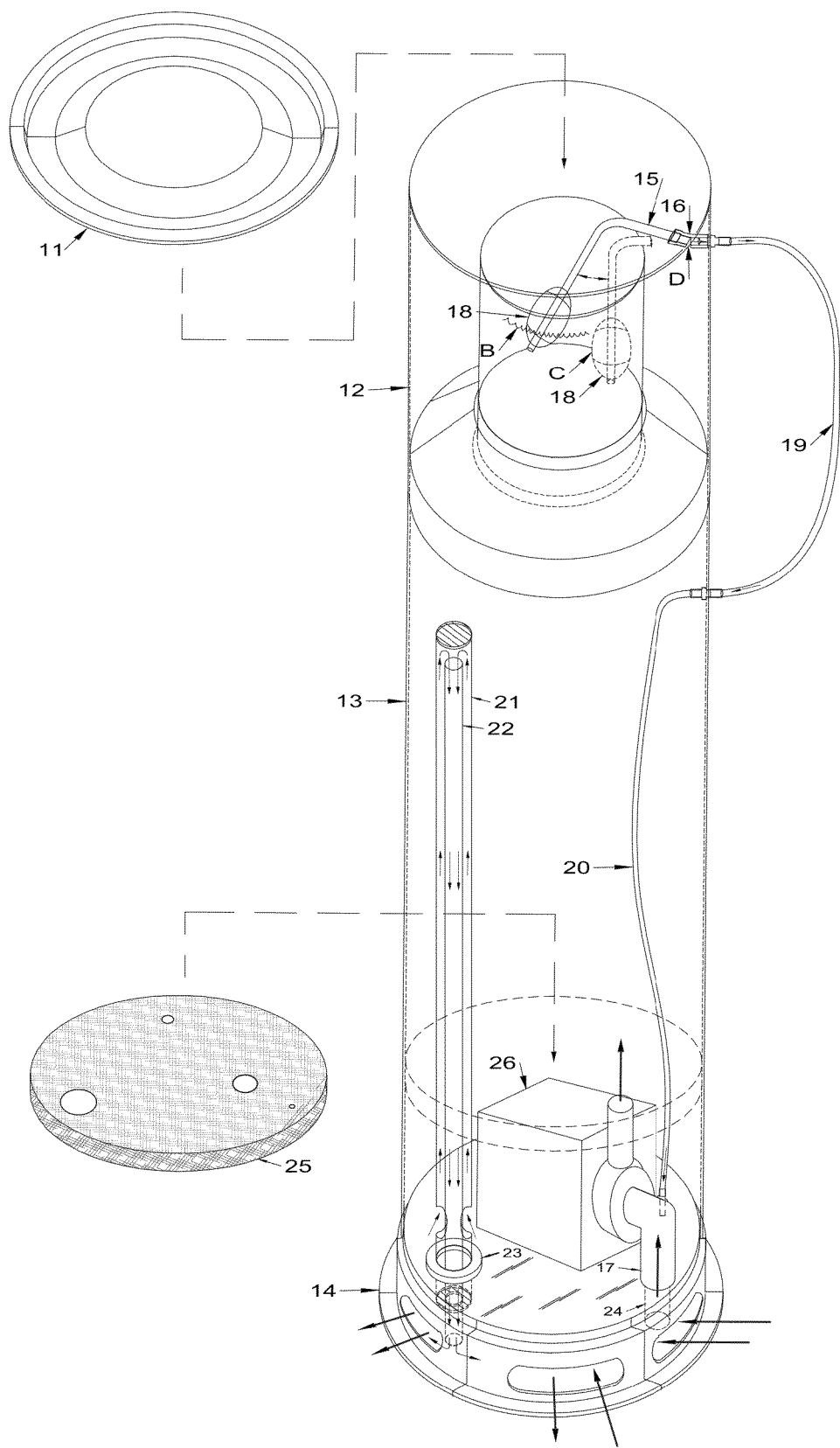
FIG. 1 is a perspective view of the preferred embodiment of the present invention.

11 Collection chamber lid
12 Collection chamber
13 Air/water chamber
14 base
15 valve actuator
16 suction inlet valve
17 water pump elbow
18 float
19 first tubing
20 second tubing
21 outer siphon tube
22 inner siphon tube
23 rubber grommet
24 intake tube
25 filter pad
26 water pump
28 first rubber O-ring
29 flow restrictor
30 first tubing connector
31 second tubing connector
32 third tubing connector
34 second rubber O-ring
35 water discharge port

DETAILED DESCRIPTION OF THE INVENTION

Figure 6:
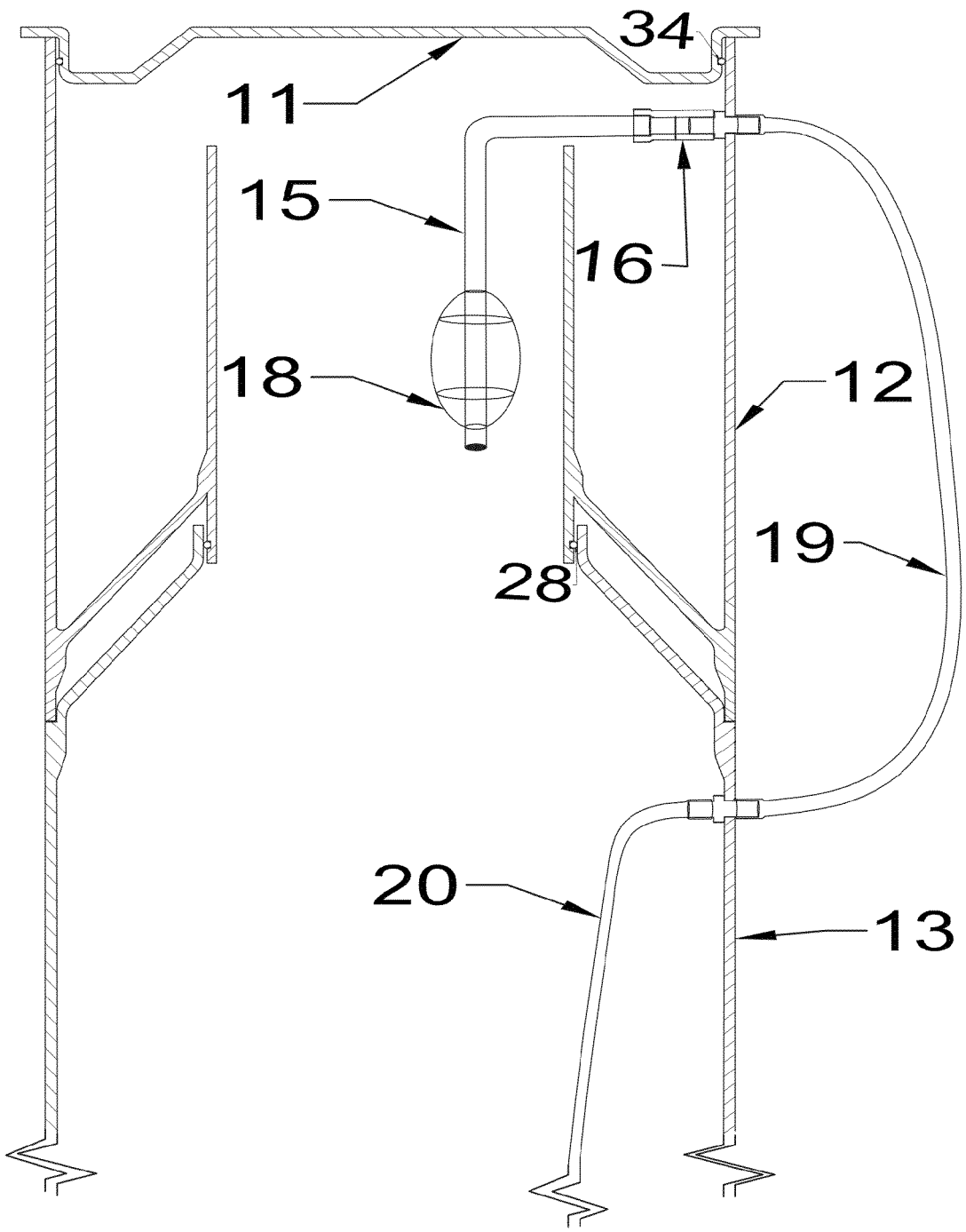
FIG. 6 is a cross-sectional view of the upper section of the protein skimmer of FIG. 5, taken along line 6-6.
Figure 7:
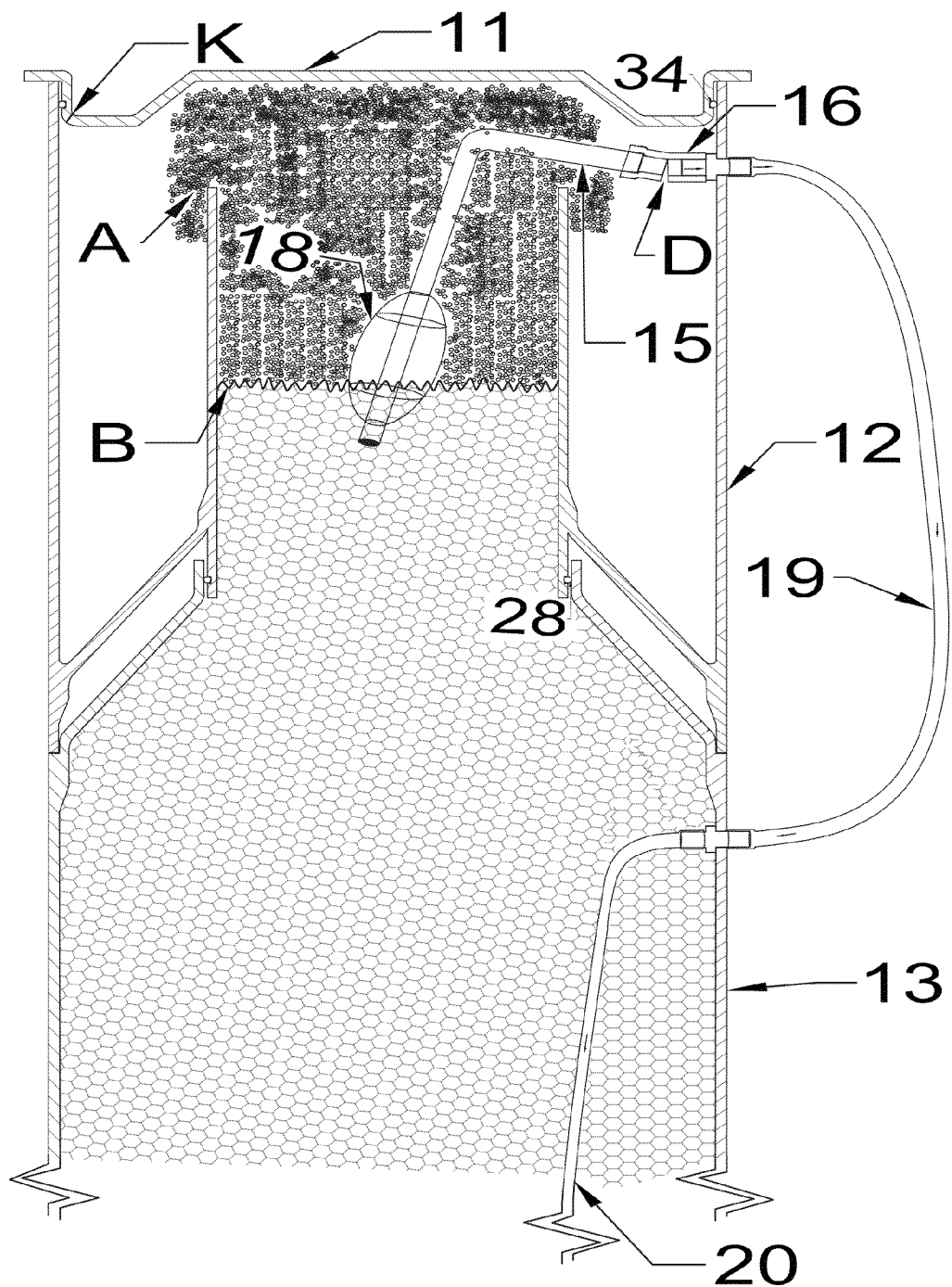
FIG. 7 is a cross-sectional view of the upper section of the protein skimmer of FIG. 5 when the invention is operational, taken along line 6-6.
Figure 8:
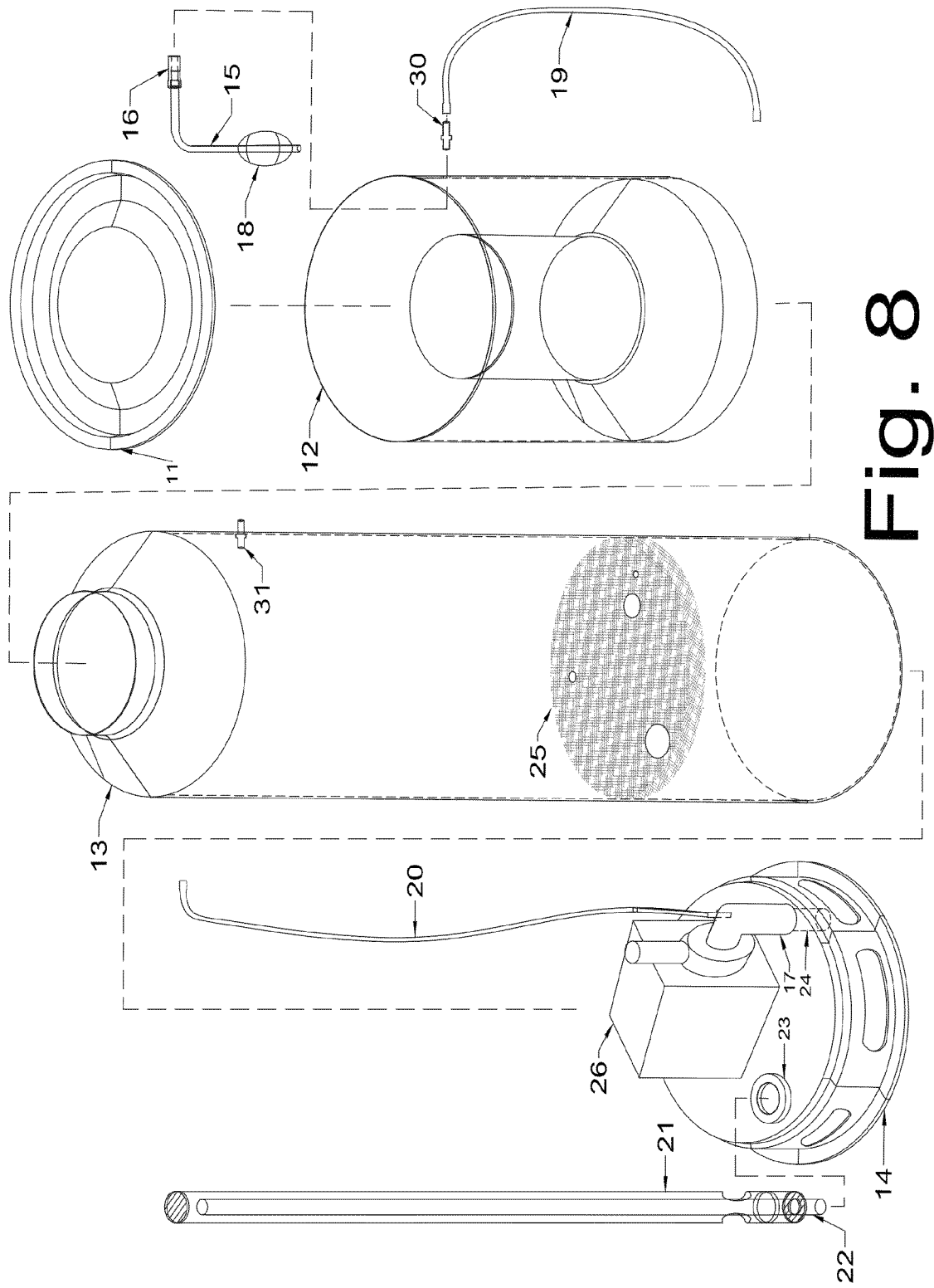
FIG. 8 is an exploded assembly view of the protein skimmer of FIG. 1.

FIG. 1 is the present disclosure of the current designed invention of a protein skimmer that could be made of any suitable rigid material preferably a transparent material. FIG. 1 Collection chamber lid (11), base (14), FIGS. 6 & 7 funnel shaped top section of air/water chamber (13), and the funnel shaped section of collection chamber (12) (connecting the outer and inner tubes), are preferably made and formed with molds by process of vacuum forming of readily available transparent flat stock material. Other parts are preferably made of readily available transparent tube stock, solid stock, flexible and rigid tubing of various diameters. FIG. 1 Filter pad (25) is of a filter mesh from readily available stock. FIG. 8 float (18), water pump (26), rubber grommet (23), first tubing connector (30), second tubing connector (31), third tubing connector (32), water pump elbow (17), are readily available retail parts. FIGS. 6 & 7 first rubber O-ring (28) and second O-ring (34) are each a readily available retail part. Parts are trimmed with a router with the aid of tooling and joined with adhesives.

Figure 4:
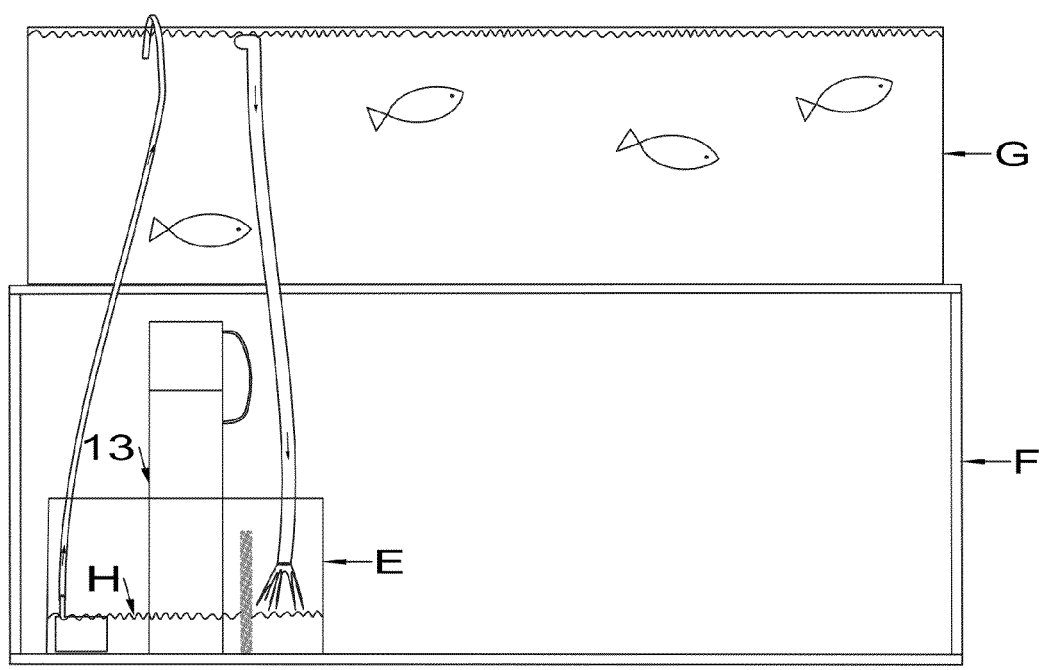
FIG. 4 is a front elevation view of a sump tank aquarium system.

FIG. 4 This particular example of designed invention of a protein skimmer is shown in part by air/water chamber (13) is intended to be partially submerged in the water (H) of an aquarium sump tank (E) application typically located in the aquarium cabinet (F) supporting the aquarium (G).

FIG. 1 The protein skimmer having a water pump (26) resting on base (14) inside air/water chamber (13), that draws water into the protein skimmer from under base (14), upward through intake tube (24) in which intake tube (24) passes through hole cutout in base (14), then into water pump elbow (17) upward through water pump (26) and out of water pump port that protrudes upward through a cutout in filter pad (25) and into air/water chamber (13). Filter pad (25) has been removed for clarity and true location is shown in hidden lines in air/water chamber (13). Float (18) and valve actuator (15) are shown in two different positions located inside the inner tube of collection chamber (12). Position reference (C) drawn with hidden lines, also shown in FIG. 6, shows float (18) and valve actuator (15) position when the protein skimmer is turned off Float (18) and valve actuator (15) drawn in solid lines is representing their position when protein skimmer is turned on and the internal water level (B) is pushing them up. They are being pushed up by the water's surface (B) opening suction inlet valve (16) allowing air to enter in suction inlet valve (16)'s intake port (D) also shown in FIG. 7. Air is then allowed to flow through first tubing (19) and second tubing (20) and enter into water pump elbow (17) and water pump (26).

FIG. 1 Base (14) elongated cutouts allow sump tank water to enter under base (14), into intake tube (24), into water pump elbow (17), into water pump (26), into air/water chamber (13) and exit back out of siphon tube (21) and (22) and back out into sump tank through these cutouts.

Figure 2:
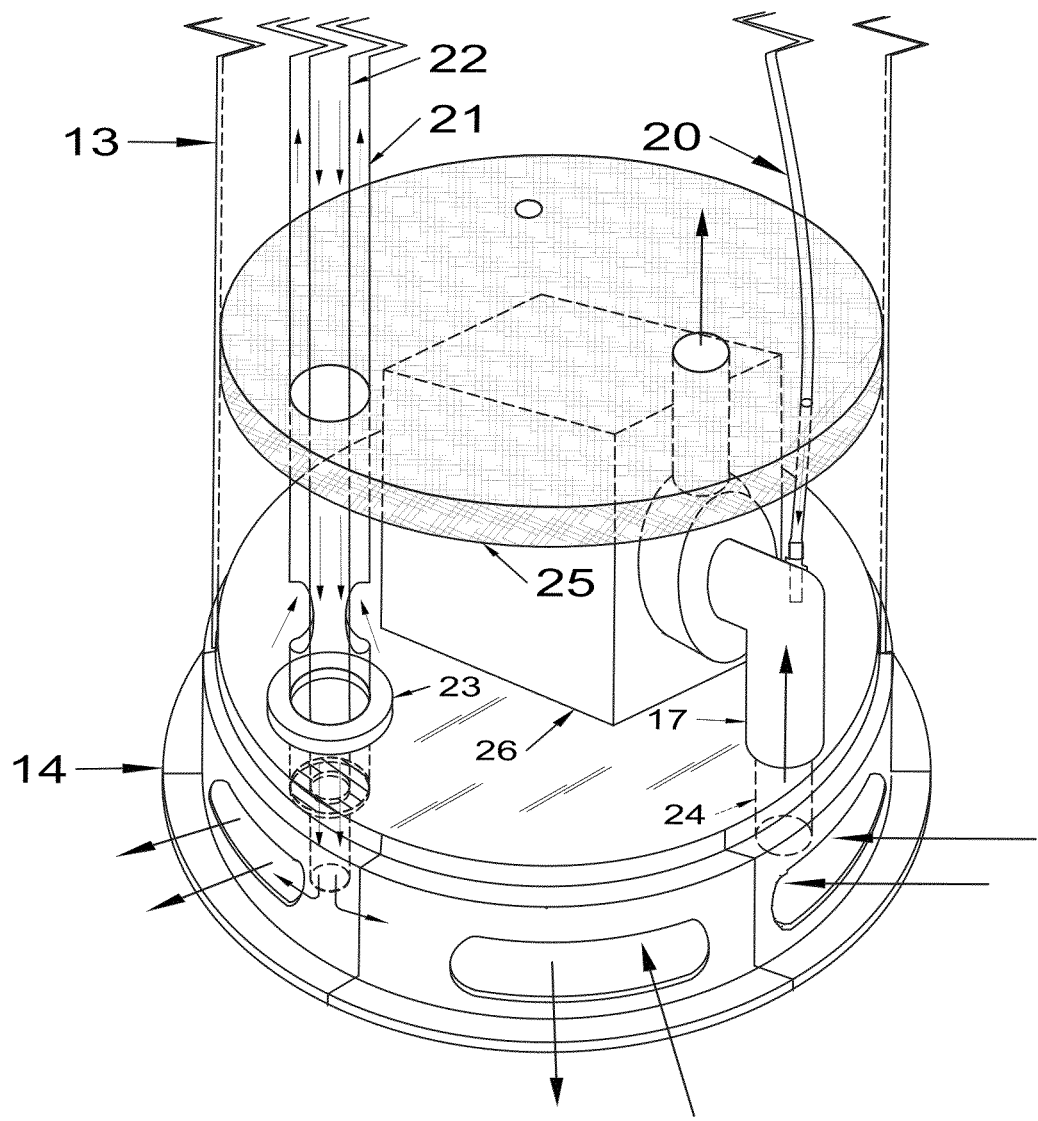
FIG. 2 is a perspective sectional view of the preferred embodiment of the lower section of the protein skimmer of the present invention shown on FIG. 1.

FIG. 2 is a close-up sectional view of the lower section of the designed invention protein skimmer of FIG. 1. Water flow is shown by arrows. Parts in FIG. 2 are base (14), air/water chamber (13), water pump (26), rubber grommet (23), filter pad (25), second tubing (20), intake tube (24), water pump elbow (17), inner siphon tube (22), and outer siphon tube (21). Filter pad (25) has four round cutouts sized and located to align and accommodate water pump (26) exhaust port, outer siphon tube (21), tubing (20), and the fourth is an open hole to allow water to pass through filter pad (25) freely in order to maintain pressure equalization above and below filter pad (25) in air/water chamber (13) to maintain a consistent flow of water past the filter pad (25) in the event the filter pad (25) becomes clogged with contaminants that would restrict water flow. This open hole is located on the opposite side of air/water chamber (13) from outer siphon tube (21) cut-outs where the water exits out of protein skimmer. The filter pad (25) diverts the current back upwards as well as capture contaminants that may otherwise return back into aquarium.

Figure 3:
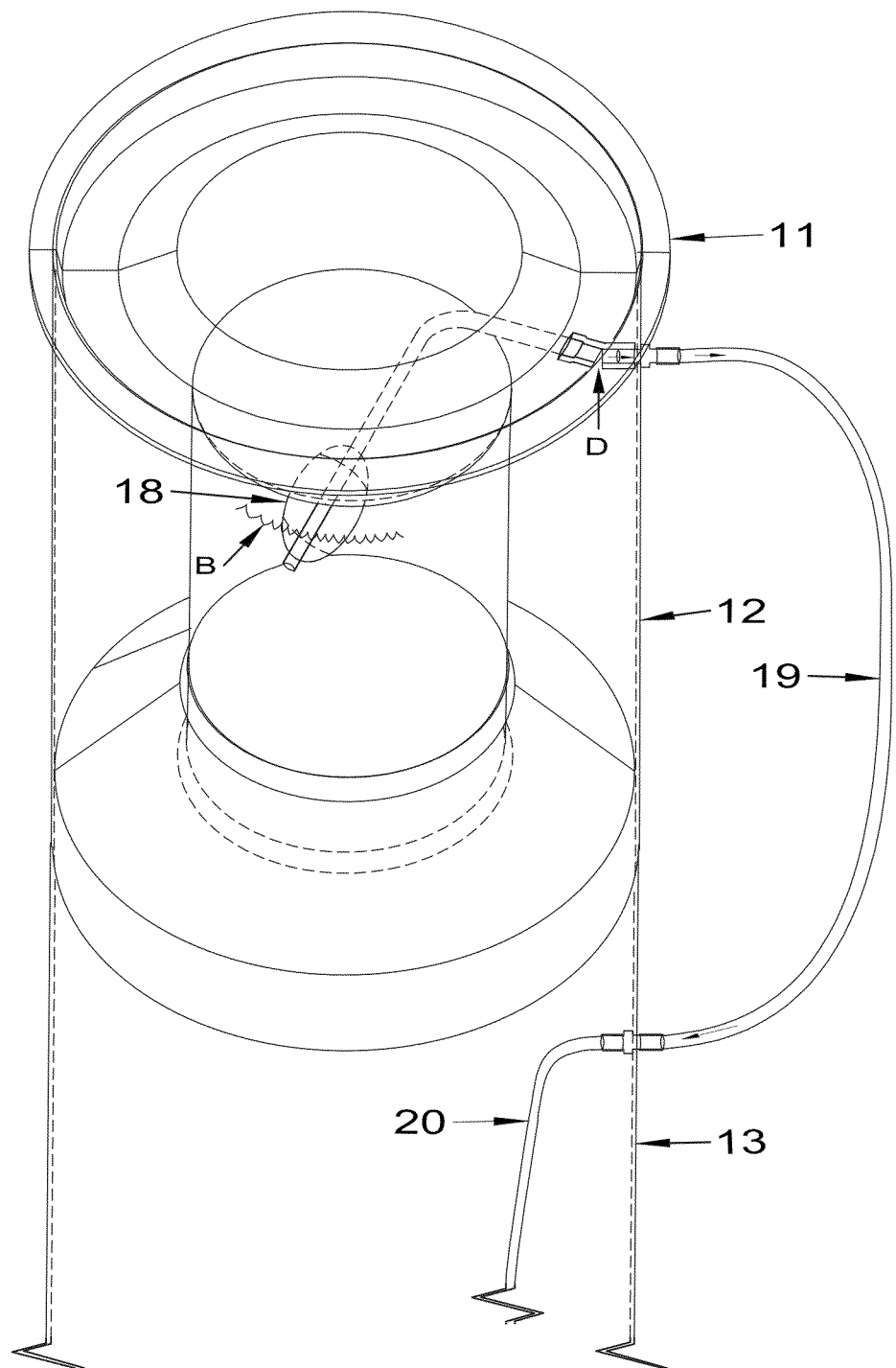
FIG. 3 is a perspective sectional view of the preferred embodiment of the upper section of the protein skimmer of the present invention shown on FIG. 1.

FIG. 3 shows a close-up perspective sectional view of the upper section of the protein skimmer showing collection chamber lid (11) attached to collection chamber (12) which is attached to air/water chamber (13).

FIG. 3 shows protein skimmer during operation with water level (B) pushing up float (18), valve actuator (15), and opening suction inlet valve (16) allowing air to enter suction inlet valve (16)'s intake port (D) and flowing into and through first tubing (19), and second tubing (20).

Figure 5:
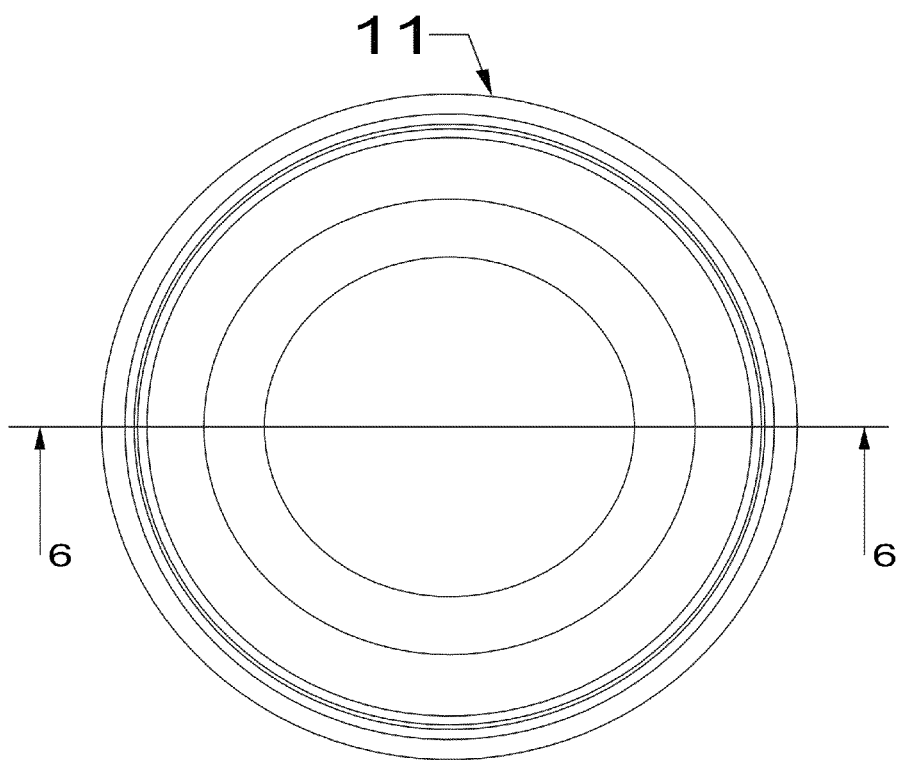
FIG. 5 is a top plan view of the protein skimmer of FIG. 3.

FIG. 5 is a top view of FIG. 3 showing collection chamber lid (11).

FIG. 6, 7 Collection chamber (12) is formed by combining an outer tube and inner tube joined and permanently attached by a funnel shaped part. Near the lowest point of the inner tube of collection chamber (12) there is a groove that holds first rubber o-ring (28) in place which seals against the inner opening at the top of the air/water chamber (13) to prevent leakage between the two parts during operation. Collection chamber (12)'s outer tube wall rests down flush against air/water chamber (13)'s outer tube wall. In collection chamber lid (11) there is a groove to hold second o-ring (34) in place which seals and secures it inside collection chamber. Also shown is first tubing (19) connected to suction inlet valve (16) and second tubing (20).

FIG. 6 Float (18), valve actuator (15), and suction inlet valve (16) are shown in protein skimmers turned off position with suction inlet valve (16) shown in its closed position.

FIG. 7 The suction inlet valve (16) is open allowing air to enter port (D) shown by directional arrows into first tubing (19) and second tubing (20). The internal water level (B) is regulated by the float (18), valve actuator (15), and suction inlet valve (16) by air flow modulation as described in the detailed description of FIG. 1. Below water line (B) protein particles in the aquarium water attach themselves to the air bubbles passing through the air/water chamber (13) floating upward to water line (B). These air bubbles accumulate as a foam column (A) and are pushed upward by the new bubbles forming. The foam column (A) grows until it is pushed into the collection chamber lid (11) outward and slowly overflows into the collection chamber (12). The bubbles eventually burst while suspended above as shown in FIG. 7, forming a dark liquid residue in the bottom of the collection chamber. Maintaining this foam column (A) overflow filled with protein particle contaminants being transported out of the aquarium water is essential for the highest rate of protein particle removal and can only be achieved by maintaining a consistent and controlled internal water level within a couple inches from the top of the collection chamber (12) inner tube.

FIG. 8 shows an exploded view of the designed invention protein skimmer major components and how they fit together. Base (14), air/water chamber (13), collection chamber (12), collection chamber lid (11), filter pad (25), water pump (26), water pump elbow (17), intake tube (24), first tubing (19) and second tubing (20), second tubing connector (31) in air/water chamber (13), first tubing connector (30) in collection chamber (12), inner siphon tube (22) inside of outer siphon tube (21), rubber grommet (23), suction inlet valve (16), valve actuator (15), and float (18).

FIG. 9 shows an exploded view of the base (14), rubber grommet (23), outer siphon tube (21) with upper and lower end caps detached for clarity. Lower end cap has a hole cutout sized to accommodate for a water tight fit of inner siphon tube (22). Outer siphon tube (21) also shows 2 cutouts on opposite sides of the tube at its lower end to allow water to enter into it. Inner siphon tube (22) has open ends. Together they are inserted through the rubber grommet (23) that is inserted into a water discharge port (35) of the base (14) that enables a water tight fit of outer siphon tube (21). FIGS. 1, 2, 8, and 9, Base (14) in symmetrical in shape with a total of 6 horizontally elongated cutouts around the perimeter, parallel to bottom of base, of which only three are visible. Therefore the back side view of base (14) is identical to the front view with the exception of the position of the two round holes cutout into its upper flat surface seen in FIG. 9. Also in this particular example base (14) is made from flat stock being vacuum formed with the use of a custom mold creating a hollow underside chamber.

FIG. 10 shows perspective, front and top views of rubber grommet (23) shown in FIG. 1, 2, 8, 9.

FIG. 11 Water pump elbow (17) has a water flow restrictor (29) inside of it witch increases the velocity of water flow across the air intake end of third tubing connector (32) increasing the vacuum venturie effect creating a suction that draws air into the water stream.

FIG. 11 shows more detail of water pump elbow (17), flow restrictor (29), third tubing connector (32), and second tubing (20). Third tubing connector (32) is inserted into hole drilled into top of water pump elbow (17) for a secure tight fit. It also shows a right side view of flow restrictor (29).

Figure 12:
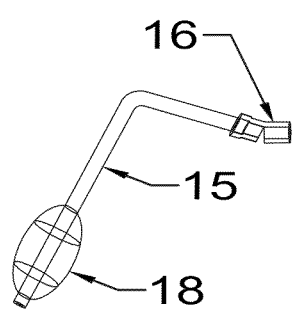
FIG. 12 is a front elevation view of 15, 16, & 18 of FIG. 7.

FIG. 12 shows valve assembly consisting of float (18), valve actuator (15), and suction inlet valve (16) with suction inlet valve (16) in the open position.

Figure 13:
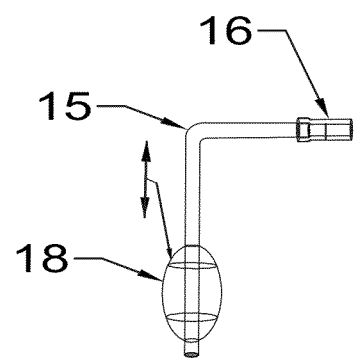
FIG. 13 is a front elevation view of 15, 16, & 18 of FIG. 6.
Figure 14:
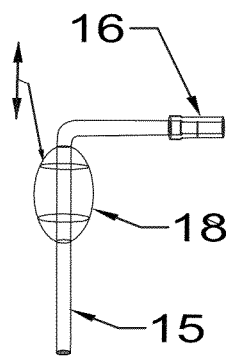
FIG. 14 is another front elevation view of 15, 16, & 18 of FIG. 6.

FIGS. 13 & 14 the float (18) is hollow and is designed so that it can be adjusted up and down the valve actuator (15) to customize the internal water level for a specific application. Valve actuator (15) is made of solid rod material. Suction inlet valve (16) is made of tubing material.

Figure 15:
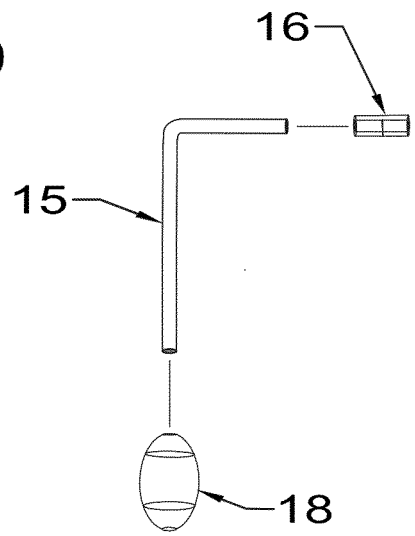
FIG. 15 is an exploded view of FIG. 13.

FIG. 15 shows an exploded view of the valve assembly consisting of float (18), valve actuator (15), and suction inlet valve (16).

Figure 16:
FIG. 16 is front elevation and side view of 16.
Figure 16:
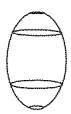

FIG. 16 shows a front and right side view of suction inlet valve (16) which is made of tubing.

Figure 17:
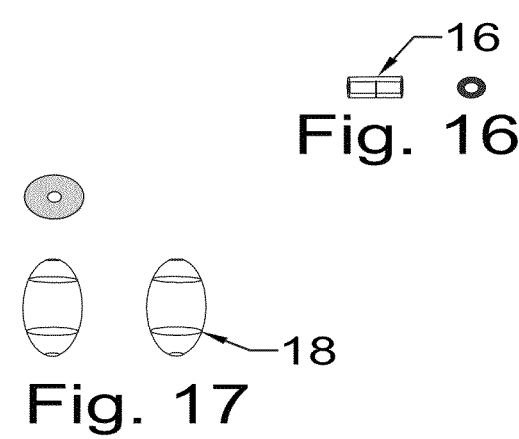
FIG. 17 is a front elevation view, top view and side elevation view of 18.

FIG. 17 shows a front, top, and right side view of float (18) which is hollow.

Figure 18:
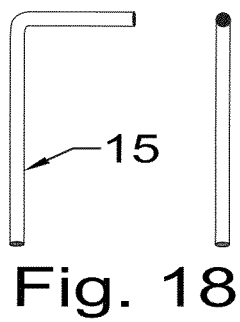
FIG. 18 is a front elevation view and side elevation view of 15.

FIG. 18 shows a front and right side view of valve actuator (15) that's made of solid cylinder material.

Figure 19:
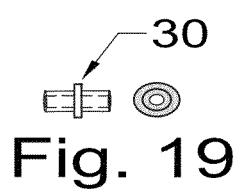
FIG. 19 is a front elevation view and side elevation view of 30.

FIG. 19 shows a front and right side view of first tubing connector (30). First tubing connector (30) is symmetrically round with a hole through it allowing air to flow through it. Second tubing connect (31) and third tubing connector (32) may be identical to first tubing connector (30).

Figure 20:
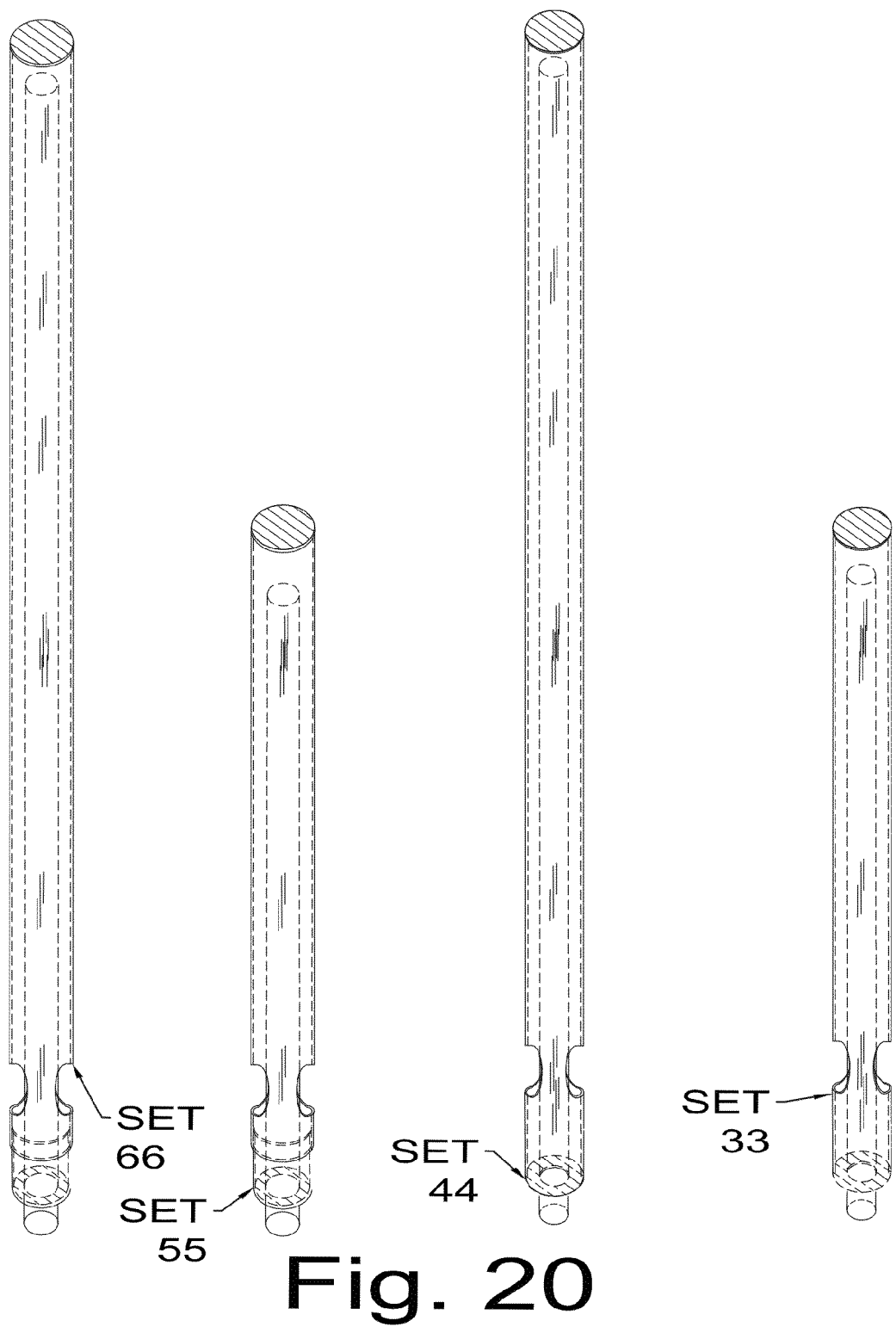
FIG. 20 is a perspective view of sets 33, 44, 55, & 66.

FIG. 20 Siphon tube sets (33), (44), (55) & (66) are made from a combination of siphon tube (21) & (22). FIG. 9. FIG. 20 Each set has a different flow rate value creating a specific amount of resistance for a particular in sump tank water level (H). FIG. 4. The longer the length the stronger the siphon suction increasing water flow. The larger the diameter of the tube the less resistance increasing water flow.

FIG. 20 Set (44) is designed for the lowest in sump tank water level having a smaller inner and outer diameter siphon tube than set (55) and (66) with high siphon suction. Next in progression is set (33) with a lower siphon suction with same diameter siphon tubes. Set (66) has larger diameter siphon tubes than set (33) & (44) increasing water flow with a high siphon suction. Set (55) has the same diameter siphon tube as set (66) with a lower siphon suction. Having the correct prescribed set installed maximizes the quantity of micro sized air bubbles creating the best results, How it Works FIG. 1 Once the protein skimmer is turned on the water pump (26) rapidly starts filling the air/water chamber (13) with water. There isn't any air being introduced into the water stream at this time since suction inlet valve (16) is closed so the water pump is at its maximum water pressure. As the water level rises in the air/water chamber (13), water is rising in the outer siphon tube (21) at the same rate by flowing into its cut-outs shown by arrows located just above the rubber grommet (23). Once the water level reaches the top of inner siphon tube (22) water begins to pour down through it and exiting underneath the base (14). Once the air is purged out of both siphon tubes (21) and (22), they act as a siphon, reducing water pressure in air/water chamber (13) allowing a high flow rate of water through the designed invention protein skimmer. As the water level continues to rise it comes in contact with the float (18) rising it upward along with valve actuator (15) which opens the suction inlet valve (16) allowing air to enter intake port (D) and flowing into first tubing (19) and second tubing (20) and down into the water pump elbow (17) were it enters into the water stream and into water pump (26). Inside water pump (26) there are impeller blades which turn the air in the water into micro sized air bubbles as the air passes through them which enter into the air/water chamber (13). Once the air enters the water stream the air/water chamber (13) fills with a flood of micro sized air bubbles and the water pump (26) pressure and water pressure inside the air/water chamber (13) drop instantly stopping the rise of the internal water level (B), float (18) and valve actuator (15). FIG. 7 The water level (B) in the collection chamber's (12) inner tube immediately stabilizes because the water level (B) governs the amount of air flow back into the protein skimmer's water pump (26) and the air flow governs the water level by modulating the water pump (26) water pressure it creates. The air flow is dependent on the water level and the water level is determined by the air flow. This is how the automatic internal water level control system functions.

FIG. 4 Water evaporation in aquarium (G) and sump tank (E) reduce the water level (H) in the sump tank (E) reducing the amount of water pressure the water pump (26) is submerged in thus reducing the amount of pressure in creates. Evaporation causing a reduction in sump tank (E) water level (H) is a constant gradual change until more water is added to the aquarium (G). The internal water level control system gradually reduces the air flow through the protein skimmer in order to maintain the same internal water level (B) FIG. 7. When water is added to the aquarium the control system quickly reacts to increase the air flow to the appropriate amount required maintaining set internal water level (B) FIG. 7.

FIG. 7 During operation the collection chamber (12) becomes pressurized with the influx of air being forced into it from the water pump (26) which means the air supply through suction inlet valve (16) back into the water pump (26) is under pressure creating an even higher volume of micro air bubbles than would be otherwise created from normal atmospheric pressure. FIG. 7 collection chamber lid (11) has a very small pressure relief hole (K) allowing a limited amount of air to escape to control the amount of air pressure in the protein skimmer. The vast majority of the same air re-circulates around and around through the protein skimmer eliminating odors and suction sounds. FIG. 7 The foam carrying the protein contaminants (A) are show being pushed up against collection chamber lid (11) and outward into collection chamber (12). Collection chamber lid (11) is sealed with second O-ring (34) to collection chamber (12). Collection chamber (12) is sealed with first O-ring (28) to air/water chamber (13) for a water tight connection as it rests upon outer circumference of air/water chamber (13).

FIG. 7 To empty collection chamber (12) do not disconnect power, disconnect first tubing (19) at either connection point.

This disables the internal water level control system maximizing the air flow into water pump. The water pressure inside protein skimmer will drop along with the internal water level (B). FIG. 1 With the appropriate siphon tube (21, 22) set chosen correctly for sump tank water level (H). FIG. 4, the internal water level will drop below first O-ring (28). FIG. 7 where collection chamber (12) can be lifted off and emptied while the designed invention protein skimmer continues to retain and collect contaminants not yet pushed into collection chamber (12). FIGS. 1 & 2 With the proper siphon tube (21, 22) set plugged into rubber grommet (23) this designed invention protein skimmer maximizes efficiency through automation.

The invention claimed is:

1. A protein skimmer apparatus comprising:
   an air/water chamber that holds a volume of fluid;
   a water pump that pumps water or air from a water intake port to said volume of fluid to generate a plurality of air bubbles in said volume of fluid;
   a collection chamber in fluid communication with said air/water chamber to receive and collect a foam generated from said volume of fluid by said plurality of air bubbles;
   a valve assembly received at least in part in said collection chamber, said valve assembly comprising a valve actuator and a float attached to said valve actuator, wherein said valve assembly moves between at least a first, non-elevated position and a second, elevated position based on fluid level associated with said volume of fluid; and
   a valve connected to said valve actuator, said valve having an inlet port in communication with a tubing assembly, said tubing assembly in communication with said water intake port of said water pump, said valve movable between an open configuration that permits airflow between said collection chamber and said water intake port and a closed position that denies airflow between said collection chamber and said water intake port, wherein said valve actuator actuates said valve from said closed configuration to said open configuration when said valve assembly moves from said first, non-elevated position to said second, elevated position and actuates said valve from said open configuration to said closed configuration when said valve assembly moves from said second, elevated position to said first, non-elevated position; wherein said water pump pumps an increased amount of air when said valve is in
   said open configuration and permits airflow from said collection chamber to said water intake port.

2. The protein skimmer apparatus of claim 1 wherein said float comprises a hollow ellipsoid adjustably attached to said valve actuator, and said tubing assembly comprises a first tubing connector, a first tubing, a second tubing connector, a second tubing, and a third tubing connector, a second end of said first tubing connector in communication with said first tubing, said first tubing in communication with said second tubing connector, said second tubing connector in communication with said second tubing, said second tubing in communication with said third tubing connector, said third tubing connector in communication with said water intake port of said water pump to allow the passage of air from said chamber into said water pump.

3. The protein skimmer apparatus of claim 1, further comprising;
   a siphon tube assembly received in said air/water chamber, said siphon tube assembly comprising an outer tube and an inner tube coaxially received in said outer tube, said outer tube in fluid communication with an interior of said air/water chamber, said outer tube in fluid communication with said inner tube, said inner tube in fluid communication with an exterior of said air/water chamber; and
   an external water discharge port formed in a base of said air/water chamber, wherein said siphon tube assembly provides a flow of said volume of fluid out of said air/water chamber via said external water dischaarge port.

4. The protein skimmer apparatus of claim 2 wherein said valve is attached in an upper half of said collection chamber.

5. The protein skimmer apparatus of claim 2 wherein said hollow ellipsoid has two holes in axial alignment with each other and frictionally connected to and slidably adjustable relative to said valve actuator.

6. The protein skimmer apparatus of claim 1 wherein said valve is centrally and predominantly severed in an upward direction and has an elastically deformable segment that acts as a pivoting axis to permit the valve to pivot upwardly on one end.

7. The protein skimmer apparatus of claim 1 wherein said valve assembly, said valve, and said water pump cooperatively operate to maintain said fluid level at the second, elevated level associated with said second, elevated position of said valve assembly.

8. The protein skimmer apparatus of claim 1 wherein said collection chamber and said air/water chamber are frictionally connected together and separable said chambers having outer diameters which are the same and are in axial alignment with each other, said air/water chamber having a protrusion that extends inwardly from an upper end of said air/water chamber and that is frictionally connected to an inner diameter of said collection chamber.

9. The protein skimmer apparatus of claim 3 wherein said outer tube has an end cap on a top end and a plurality of water discharge ports laterally cut in a lower half of said outer tube, a lower end of said outer tube having an inner diameter reduced to a width equal to an external width of said inner tube, said outer tube and said inner tube in axial alignment, said inner tube coaxially received in said lower end of said outer tube and extending adjacent to the top end of said outer tube, said inner tube frictionally connected to said outer tube.

10. The protein skimmer apparatus of claim 3, further comprising;
    a grommet axially aligned with and frictionally connected to a portion of said base that forms said external water discharge port, said siphon tube assembly having an external width equal to an internal width of said grommet, said siphon tube assembly frictionally connected to said grommet, said siphon tube assembly having said inner tube that has a lower end terminating exterior to said air/water chamber.

11. The protein skimmer apparatus of claim 1, further comprising:
    a filter pad removably attached to said air/water chamber, an outer diameter of said filter pad equal to a diameter of said air/water chamber, said filter pad positioned between a fluid entry location associated with exit of fluid from said air/water chamber.

12. The protein skimmer apparatus of claim 1, further comprising:
    a flow restrictor received within the water intake port of the water pump, wherein the flow restrictor increases a velocity of water flow across an air intake end of the tubing assembly.

13. The protein skimmer apparatus of claim 1 wherein a height of a attachment of said float relative to said valve actuator is adjustable.

14. The protein skimmer apparatus of claim 1 wherein the air/water chamber comprises a first outer cylindrical portion and a protrusion that extends radially inwardly and upwardly from the first outer cylindrical portion, and the collection chamber comprises a second outer cylindrical portion and an inverted funnel portion, the second outer cylindrical portion axially aligned with the first outer cylindrical portion, the inverted funnel portion comprising an inner cylindrical portion that extends upwardly from an inner end of the protrusion.

15. The protein skimmer apparatus of claim 1 wherein the valve comprises a piece of cylindrical tubing that has a cut partially laterally therethrough.

16. The protein skimmer apparatus of claim 1 wherein the protein skimmer apparatus operates to maintain said fluid level associated with said volume of fluid such that the valve assembly is maintained in the second, elevated position for at least a majority of time the protein skimmer apparatus is in operation.

\* \* \* \* \*

UNITED STATES PATENT AND TRADEMARK OFFICE
CERTIFICATE OF CORRECTION

PATENT NO.         : 9,078,419 B1
APPLICATION NO.    : 13/986064
DATED              : July 14, 2015
INVENTOR(S)        : James Allan Vassallo Page 1 of 1

It is certified that error appears in the above-identified patent and that said Letters Patent is hereby corrected as shown below:

Claims

Column 10, Line 8, claim 3:
"water chamber via said external water dischaarge port." should read, -- water chamber via said external water discharge port. --.

Column 10, Lines 52-58, claim 11:
"11. The protein skimmer apparatus of claim 1, further comprising: a filter pad removably attached to said air/water chamber, an outer diameter of said filter pad equal to a diameter of said air/water chamber, said filter pad positioned between a fluid entry location associated with exit of fluid from said air/water chamber." should read, -- 11. The protein skimmer apparatus of claim 1, further comprising: a filter pad removably attached to said air/water chamber, an outer diameter of said filter pad equal to a diameter of said air/water chamber, said filter pad positioned between a fluid entry location associated with entry of fluid to said air/water chamber via said water pump and a fluid exit location associated with the exit of fluid from said air/water chamber. --.

Signed and Sealed this
Twenty-ninth Day of March, 2016

Michelle K. Lee
*Director of the United States Patent and Trademark Office*